US012247530B2

(12) United States Patent
Yamaguchi et al.

(10) Patent No.: US 12,247,530 B2
(45) Date of Patent: Mar. 11, 2025

(54) CANISTER

(71) Applicant: FUTABA INDUSTRIAL CO., LTD., Okazaki (JP)

(72) Inventors: Kyohei Yamaguchi, Okazaki (JP); Koji Iwamoto, Okazaki (JP); Masaaki Kakuchi, Okazaki (JP)

(73) Assignee: FUTABA INDUSTRIAL CO., LTD., Okazaki (JP)

(*) Notice: Subject to any disclaimer, the term of this patent is extended or adjusted under 35 U.S.C. 154(b) by 0 days.

(21) Appl. No.: 18/623,302

(22) Filed: Apr. 1, 2024

(65) Prior Publication Data

US 2024/0352910 A1 Oct. 24, 2024

(30) Foreign Application Priority Data

Apr. 20, 2023 (JP) ................................ 2023-069236

(51) Int. Cl.
*F02M 25/08* (2006.01)

(52) U.S. Cl.
CPC ............................... *F02M 25/0854* (2013.01)

(58) Field of Classification Search
CPC .................................................. F02M 25/0854
See application file for complete search history.

(56) References Cited

U.S. PATENT DOCUMENTS 5,269,837 A * 12/1993 Ohashi ............... B01D 53/0407 96/144
2005/0061301 A1* 3/2005 Meiller ............. F02M 25/0854 123/519
2005/0172938 A1* 8/2005 Uchino .............. F02M 25/0854 96/132
2005/0204924 A1* 9/2005 Nakamura ......... F02M 25/0854 96/147
2006/0065251 A1* 3/2006 Meiller .............. F02M 25/0854 123/519
2006/0065252 A1* 3/2006 Meiller .............. F02M 25/0854 123/519

(Continued)

FOREIGN PATENT DOCUMENTS

JP 06307300 A * 11/1994
JP 2008202604 A * 9/2008 ......... F02M 25/0854

(Continued)

*Primary Examiner* — John M Zaleskas
(74) *Attorney, Agent, or Firm* — Withrow + Terranova, PLLC; Vincent K. Gustafson

(57) ABSTRACT

Provided is a canister configured to adsorb and desorb an evaporated fuel originating in a fuel tank of a vehicle. The canister includes an outer case, a coupling port, an inner case, and at least one first protrusion. The outer case includes an inner surface defining an internal space extending in a first direction. The coupling port couples an inside and an outside of the outer case. The inner case is a cylindrical member accommodating therein an adsorbent for adsorbing the evaporated fuel. The at least one first protrusion protrudes outwards from an outer surface of the inner case. A fluid flows through the internal space in the first direction. The inner case is press-fitted inside the outer case so as to be accommodated in the internal space. The at least one first protrusion contacts a part of the inner surface of the outer case extending in the first direction.

3 Claims, 3 Drawing Sheets

(56) References Cited

U.S. PATENT DOCUMENTS

2007/0228724 A1* 10/2007 Zuchara ............. F02M 25/0854 285/148.18
2009/0223370 A1* 9/2009 Kosugi .............. B01D 53/0407 96/108
2009/0320806 A1* 12/2009 Lang ..................... H04L 27/361 123/549
2012/0234301 A1* 9/2012 Takamatsu ......... F02M 25/0854 123/519
2012/0260893 A1* 10/2012 Makino .............. F02M 25/0854 123/519
2012/0304865 A1* 12/2012 Sugiura .............. F02M 25/0854 96/131
2013/0000610 A1* 1/2013 Yamamoto ........... F02M 25/089 123/519
2013/0037006 A1* 2/2013 Kosugi .............. F02M 25/0854 123/520
2013/0284154 A1* 10/2013 Makino .............. F02M 25/0854 123/519
2013/0291839 A1* 11/2013 Lin ........................ F02M 33/02 123/518
2015/0176540 A1* 6/2015 Danielowski .......... F02M 25/08 123/519
2015/0316008 A1* 11/2015 Catton ............... F02M 25/0854 96/152
2018/0266363 A1* 9/2018 Minezawa ............. F02M 25/08
2018/0266364 A1* 9/2018 Park ................... F02M 35/0214
2022/0062813 A1* 3/2022 Iwamoto .............. B60K 15/035
2022/0065202 A1* 3/2022 Iwamoto ............ F02M 25/0854
2023/0149847 A1* 5/2023 Iwamoto ............ B01D 53/0407 96/130
2023/0151782 A1* 5/2023 Iwamoto ............ B01D 53/0446 96/108
2024/0068429 A1* 2/2024 Iwamoto ............ F02M 25/0854

FOREIGN PATENT DOCUMENTS

JP 4173065 B2 10/2008
JP 2010144549 A * 7/2010
JP 2015048841 A * 3/2015
JP 2015086847 A * 5/2015

* cited by examiner

CANISTER

CROSS-REFERENCE TO RELATED APPLICATIONS

This application claims the benefit of Japanese Patent Application No. 2023-069236 filed on Apr. 20, 2023 with the Japan Patent Office, the entire disclosure of which is incorporated herein by reference.

BACKGROUND

The present disclosure relates to a canister.

A vehicle such an automobile is equipped with a canister that inhibits evaporated fuel originating in a fuel tank from being discharged into the atmosphere. The canister is filled therein with an adsorbent such as activated carbon. The evaporated fuel originating in the fuel tank is introduced into the canister and is then temporarily adsorbed by the adsorbent. The evaporated fuel adsorbed is desorbed from the adsorbent upon ignition of an internal combustion engine or the like, and then the evaporated fuel desorbed is supplied to the internal combustion engine.

Japanese Patent No. 4173065 discloses an evaporated fuel treatment device in which a cylindrical adsorbent cartridge filled with an adsorbent is fitted inside a casing configuring a canister.

SUMMARY

In the evaporated fuel treatment device disclosed in Japanese Patent No. 4173065, the adsorbent cartridge is provided therearound with two or more ribs formed integrally with a flange. Respective rims of the flange and the two or more ribs are formed so as to correspond to a shape of an inner surface of the casing. The flange and the two or more ribs are formed so as to be fitted into the casing in a freely slidable manner. Thus, if the adsorbent cartridge is fitted to the casing by means of press-fit, there is an increased area of contact between the adsorbent cartridge and the casing. Consequently, a press-fit load at the time of the fitting is high.

In one aspect of the present disclosure, it is desirable to reduce the press-fit load.

One aspect of the present disclosure provides a canister configured to adsorb and desorb an evaporated fuel originating in a fuel tank of a vehicle. The canister comprises an outer case, a coupling port, an inner case, and at least one first protrusion. The outer case includes an inner surface defining an internal space extending in a first direction. The coupling port couples an inside and an outside of the outer case. The inner case is a cylindrical member. The inner case accommodates therein an adsorbent for adsorbing the evaporated fuel. The at least one first protrusion protrudes outwards from an outer surface of the inner case. The outer case carries a fluid through the internal space in the first direction. The inner case is press-fitted inside the outer case so as to be accommodated in the internal space. The at least one first protrusion contacts a part of the inner surface of the outer case extending in the first direction.

Since the configuration above provides the at least one first protrusion, an area of contact between the inner case and the outer case is reduced when the inner case is fitted in the outer case. This can consequently reduce a press-fit load at the time of press-fitting the inner case in the outer case.

In one aspect of the present disclosure, the inner case may comprise a first end and a second end. The first end is located closer to the coupling port with respect to the second end. The second end is located opposite to the first end. The at least one first protrusion may be formed in a vicinity of the second end.

Such a configuration reduces an area of contact between the at least one first protrusion and the outer case when the inner case is fitted in the outer case.

Consequently, the press-fit load at the time of press-fitting the inner case in the outer case can be reduced.

In one aspect of the present disclosure, the at least one first protrusion may have a plate-like shape. The at least one first protrusion may extend along the first direction.

Such a configuration reduces an area of contact between the at least one first protrusion and the outer case when the inner case is fitted in the outer case.

Consequently, the press-fit load at the time of press-fitting the inner case in the outer case can be reduced.

In one aspect of the present disclosure, the canister may further comprise a sealing member. The inner case may comprise a first end and a second end. The first end is located closer to the coupling port with respect to the second end. The sealing member seals a gap between a periphery of the first end and the inner surface of the outer case.

Such a configuration can improve sealability with respect to the gap between the inner case and the outer case.

In one aspect of the present disclosure, the canister may further comprise at least one second protrusion. The at least one second protrusion may protrude outwards from an outer peripheral surface of the inner case. There may be a gap between the at least one second protrusion and the outer case. The at least one second protrusion may be formed along the first direction.

Such a configuration can inhibit the inner case from tilting with respect to the outer case when the inner case is fitted in the outer case. Consequently, there is provided ease of fitting between the inner case and the outer case.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

Embodiments of the present disclosure are not limited to embodiments described below, and can take various forms within the technical scope of the present disclosure.

1. First Embodiment

[1-1. Configuration]

[1-1-1. Overall Configuration]

Figure 1:
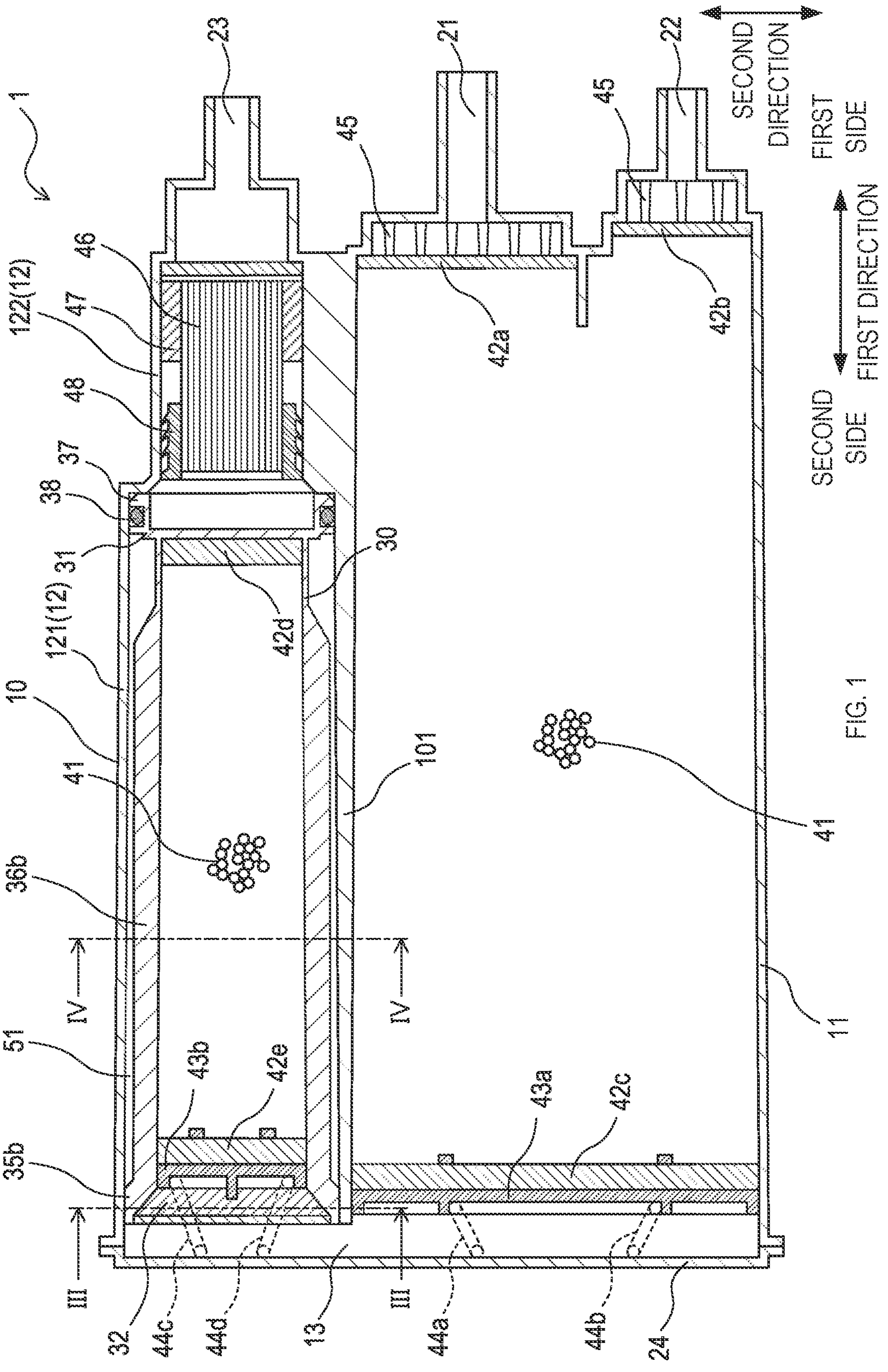
FIG. 1 is a sectional view of a canister according to a first embodiment sliced perpendicularly to a third direction.

There is provided a canister 1 as illustrated in FIG. 1. The canister 1 is mounted in a vehicle such as an automobile. The canister 1 is configured to adsorb evaporated fuel originating in a fuel tank of the vehicle, to thereby inhibit the evaporated fuel from being discharged to the outside of the vehicle. The canister 1 is configured to draw atmospheric air from the outside of the vehicle, to thereby desorb the evaporated fuel adsorbed (hereinafter, simply referred to as "adsorbed evaporated fuel"). The canister 1 is configured to discharge the evaporated fuel desorbed (hereinafter, simply referred to as "desorbed evaporated fuel") to an internal combustion engine.

The canister 1 comprises an outer case 10, a first chamber 11, a second chamber 12, a charge port 21, a purge port 22, an atmosphere port 23, a lid 24, and a coupling path 13.

In one example, the outer case 10 is a resin-made member having a substantially rectangular parallelepiped shape.

Both the first chamber 11 and the second chamber 12 include respective spaces partitioned by an inner wall 101 within the outer case 10. Both the first chamber 11 and the second chamber 12 extend in a first direction, and are aligned in a second direction orthogonal to the first direction. Hereinafter, a direction orthogonal to both the first direction and the second direction is referred to as "third direction". Respective lengths of the first chamber 11 and the second chamber 12 in the first direction are not particularly limited. Specifically, the respective lengths of the first chamber 11 and the second chamber 12 in the first direction may be longer than, shorter than, or the same as their lengths in the second direction or the third direction.

Both the charge port 21 and the purge port 22 are members disposed at an end of the first chamber 11 in the first direction. Hereinafter, a side of the outer case 10 (and thus, the canister 1) in the first direction where the charge port 21 and the purge port 22 are disposed is referred to as "first side", whereas an opposite side to the first side in the first direction is referred to as "second side". The charge port 21 is coupled to the fuel tank. The charge port 21 is configured to draw the evaporated fuel into the first chamber 11. The purge port 22 is coupled to an intake pipe of the internal combustion engine of the vehicle. The purge port 22 is configured to discharge the evaporated fuel inside the first chamber 11.

The atmosphere port 23 is a member disposed at an end on the first side (first end) of the second chamber 12. Specifically, the atmosphere port 23 is arranged on the same side as the charge port 21 and the purge port 22 in the first direction. The atmosphere port 23 is connected to the outside of the vehicle. The atmosphere port 23 is configured to draw the atmospheric air into the second chamber 12 or discharge the atmospheric air inside the second chamber 12.

The lid 24 is a member closing an end on the second side (second end) of the outer case 10.

The coupling path 13 is a space provided at the second end inside the outer case 10 between the first chamber 11 and the second chamber 12, and the lid 24. The first chamber 11 and the second chamber 12 communicate with each other via the coupling path 13.

The first chamber 11, the coupling path 13, and the second chamber 12 form a substantially U-shaped flow path, inside the outer case 10, configured to carry a fluid such as the evaporated fuel or the atmospheric air. The fluid flows through the first chamber 11 and the second chamber 12 along the first direction.

[1-1-2. Inner Configuration of Canister]

There are arranged, at the first end inside the first chamber 11, filters 42*a* and 42*b* supported by two or more support columns 45 (FIG. 1). There is arranged, at an end on the second side (second end) inside the first chamber 11, a filter 42*c* supported by a grid 43*a*. The grid 43*a* includes two or more holes so as to carry therethrough the fluid such as the evaporated fuel or the atmospheric air. The fluid flows into or flows out of the first chamber 11 through the filters 42*a*, 42*b*, or 42*c*.

The first chamber 11 is filled, therein between the filters 42*a* and 42*b*, and the filter 42*c*, with an adsorbent 41 for adsorbing the evaporated fuel. One example of the adsorbent 41 includes activated carbon.

Between the grid 43*a* and the lid 24, there are arranged springs 44*a* and 44*b* so as to couple the grid 43*a* and the lid 24. The springs 44*a* and 44*b* are elastic members. The springs 44*a* and 44*b* exert a force to the adsorbent 41 toward the charge port 21 and the purge port 22 via the grid 43*a* and the filter 42*c*.

The second chamber 12 includes a main chamber (hereinafter, referred to as "second main chamber 121") and an auxiliary chamber (hereinafter, referred to as "second auxiliary chamber 122"). An end on the second side (second end) of the second main chamber 121 is open when the lid 24 is removed. The second main chamber 121 is coupled to the coupling path 13 on the second side thereof. The second main chamber 121 is coupled to the second auxiliary chamber 122 on the first side thereof. The second auxiliary chamber 122 is coupled to the second main chamber 121 on the second side thereof. The second auxiliary chamber 122 is coupled to the atmosphere port 23 on the first side thereof.

The second main chamber 121 has a substantially rectangular shape in a cross-section perpendicular to the first direction. This cross-section has a cross-sectional area reduced from the second side to the first side. The second auxiliary chamber 122 is smaller in a cross-section perpendicular to the first direction as compared to the cross-section of the second main chamber 121.

There is an inner case 30 fitted inside the second main chamber 121. The inner case 30 is filled therein with the adsorbent 41. The inner case 30 has a substantially rectangular parallelepiped shape extending along the first direction. The inner case 30 has a length in the first direction that is not particularly limited, and may be longer than, shorter than, or the same as a length of the inner case 30 in the second direction or the third direction. Both an end on the first side (first end) and an end on the second side (second end) of the inner case 30 are open. The inner case 30 is coupled to the second auxiliary chamber 122 on the first side thereof. The inner case 30 is coupled to the coupling path 13 on the second side thereof. Both the first end and the second end of the inner case 30 contact an inner surface of the second main chamber 121. Contact portions will be described later.

There is provided a grid 39 in an open part of the inner case 30 on the first side. A filter 42*d* supported by the grid 39 is arranged at the first end inside the inner case 30. A filter 42*e* is arranged at the second end of the inner case 30. The filter 42*e* is supported by a grid 43*b*. The filter 42*e* is not joined (for example, not welded) to the inner case 30, the grid 43*b*, or the like. The filter 42*e* is supported by a hook protruding from the grid 43*b*. The grid 39 and the grid 43*b* include two or more holes so as to carry therethrough the fluid such as the evaporated fuel or the atmospheric air. The fluid flows into or flows out of the inner case 30 through the filter 42*d* or 42*e*. The fluid flows through the inner case 30 along the first direction.

Between the grid 43*b* and the lid 24, there are arranged springs 44*c* and 44*d* so as to couple the grid 43*b* and the lid 24. The springs 44*c* and 44*d* are elastic members. The springs 44*c* and 44*d* exert a force to the adsorbent 41 toward the second auxiliary chamber 122 (in other words, toward the atmosphere port 23) via the grid 43*b* and the filter 42*e*.

There are arranged a honeycomb filter 46, a retainer 47, and a sealing rubber 48 inside the second auxiliary chamber 122. The honeycomb filter 46 is a cylindrical adsorbent extending in the first direction. The honeycomb filter 46 includes two or more flow paths penetrating therethrough in the first direction. In one example, the honeycomb filter 46 is made from activated carbon. An outer circumference of the honeycomb filter 46 on the first side is covered by the retainer 47 (made of urethane, in one example) having a cylindrical shape. The retainer 47 contacts an inner surface of the outer case 10 and an inner surface of inner wall 101. On the other hands, respective gaps between the inner surfaces of the outer case 10 and the inner wall 101, and an outer circumference of the honeycomb filter 46 on the second side are sealed by the sealing rubber 48 having a cylindrical shape. Thus, the honeycomb filter 46 is supported by the retainer 47 and the sealing rubber 48.

[1-1-3. Configuration of Inner Case]

Figure 2:
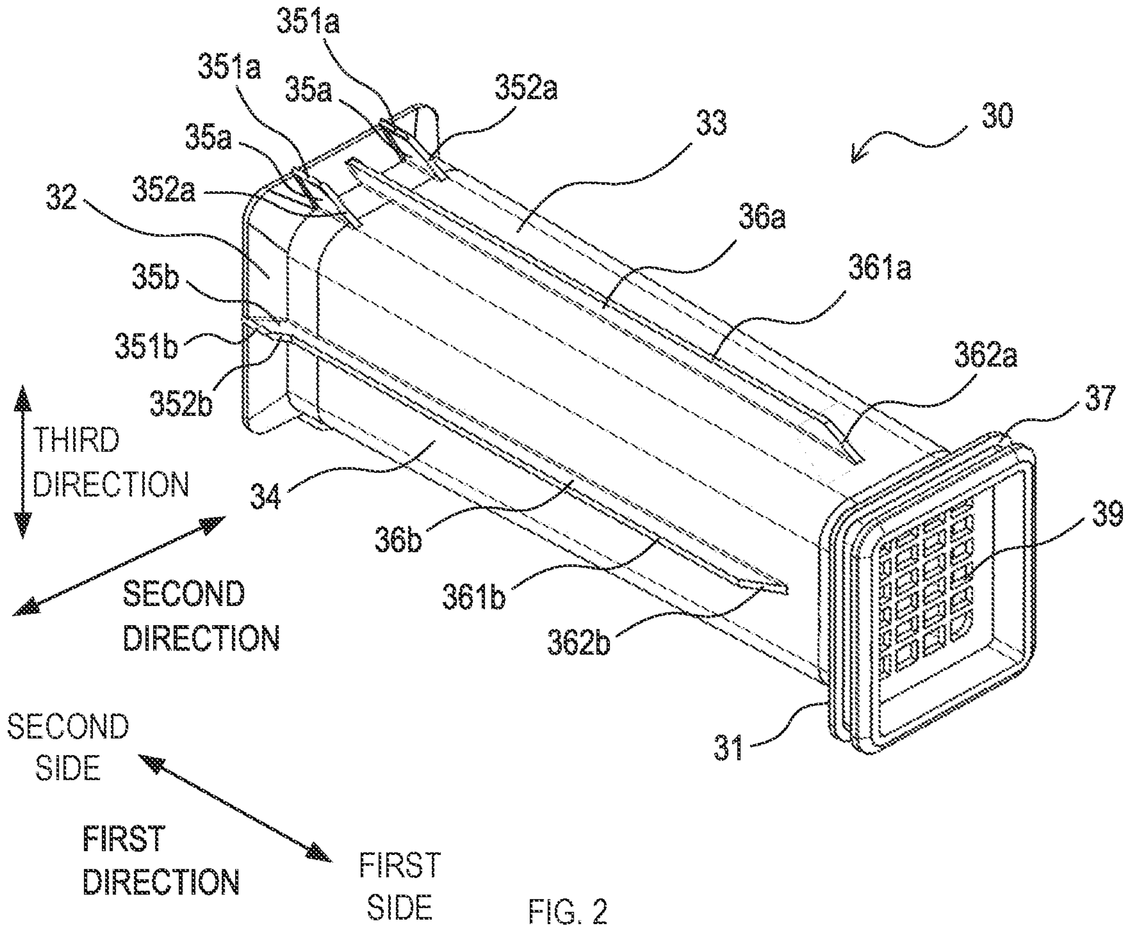
FIG. 2 is a perspective view of an inner case of the canister according to the first embodiment.

The inner case 30 illustrated in FIG. 2 includes a first flange 31, a second flange 32, first side surfaces 33, second side surfaces 34, first protrusions including first protrusions 35*a* and first protrusions 35*b*, and second protrusions including second protrusions 36*a* and second protrusions 36*b*.

The first flange 31 protrudes outwards from an outer periphery of the first end on the first side of the inner case 30. A periphery of the first flange 31 is provided with a groove 37. In the groove 37, there is attached a sealing member 38, which is an elastic member (see, FIG. 1). In one example, the sealing member 38 is an O-ring. In the state where the inner case 30 is fitted inside the second main chamber 121, a gap between the first flange 31 and the second main chamber 121 is sealed by the sealing member 38.

The second flange 32 protrudes outwards from the outer periphery of the inner case 30 at the second end.

The first side surfaces 33 consist of two outer peripheral surfaces of the inner case 30 perpendicular to the third direction. The second side surfaces 34 consist of two outer peripheral surfaces of the inner case 30 perpendicular to the second direction. Hereinafter, any distance from the outer peripheral surfaces of the inner case 30 in a direction perpendicular to the outer peripheral surfaces is referred to as “height”.

The first protrusions 35*a* are plate-like portions. The first protrusions 35*a* protrude outwards of the inner case 30 from ends on the second side (second ends) of the respective first side surfaces 33. The first protrusions 35*a* expand along the first direction and the third direction. The first protrusions 35*a* are continuous to a surface of the second flange 32 on the first side. In the present embodiment, as one example, two first protrusions 35*a* are provided to each first side surface 33, that is, there are provided four first protrusions 35*a* in total. It should be noted that the first protrusions 35*a* may be separated from the second flange 32.

Each first protrusion 35*a* includes a first tip end 351*a* and a first slanting portion 352*a*. The first tip end 351*a* is an end face of the first protrusion 35*a* in the third direction. The first tip end 351*a* extends substantially in parallel to the first side surface 33 in the first direction. The first tip end 351*a* has a plate thickness tapered as being distanced from the first side surface 33. In the present embodiment, as one example, the first tip end 351 *a* has a triangular shape in a cross-section perpendicular to the first direction. The first tip end 351*a* is fragile and is thus prone to deform as compared to the remaining part of the first protrusion 35*a*. The first tip end 351*a* has a height greater than a height of an end face of the second flange 32. The first slanting portion 352*a* is an end face of the first protrusion 35*a*. The first slanting portion 352*a* extends from an end on the first side (first end) of the first tip end 351*a* toward the first side surface 33. The first slanting portion 352*a* slants with respect to the first side surface 33 such that a height of the first slanting portion 352*a* is smaller toward the first side surface 33.

The second protrusions 36*a* are plate-like portions. The second protrusions 36*a* protrude outwards of the inner case 30 in the third direction from the respective first side surfaces 33. The second protrusions 36*a* extend along the first direction from the second ends of the respective first side surfaces 33 to the vicinity of ends on the first side (first ends) of the respective first side surfaces 33. The second protrusions 36*a* are continuous to the surface of the second flange 32 on the first side. In the present embodiment, as one example, one second protrusion 36*a* is provided to each of the two first side surfaces 33, that is, there are two second protrusions 36*a* in total. It should be noted that the second protrusions 36*a* may be separated from the second flange 32.

Each second protrusion 36*a* includes a top portion 361*a* and a second slanting portion 362*a*. The top portion 361*a* is an end face of the second protrusion 36*a* in the third direction. The top portion 361*a* extends substantially in parallel to the first side surface 33 along the first direction. The top portion 361*a* has a height smaller than the height of the end face of the second flange 32. The second slanting portion 362*a* is an end face of the second protrusion 36*a*. The second slanting portion 362*a* extends from an end on the first side (first side) of the top portion 361*a* toward the first side surface 33. The second slanting portion 362*a* slants with respect to the first side surface 33 such that a height of the second slanting portion 362*a* is smaller toward the first side.

The first protrusions 35*b* are plate-like portions. The first protrusions 35*b* protrude outwards of the inner case 30 from ends on the second side (second ends) of the respective second side surfaces 34. The first protrusions 35*b* expand along the first direction and the second direction. The first protrusions 35*b* are continuous to the surface of the second flange 32 on the first side. In the present embodiment, as one example, one first protrusion 35*b* is provided to each of the two second side surfaces 34, that is, there are two first protrusions 35*b* in total. It should be noted that the first protrusions 35*b* may be separated from the second flange 32.

Each first protrusion 35*b* includes a first tip end 351*b* and a first slanting portion 352*b*. The first tip end 351*b* is an end face of the first protrusion 35*b* in the second direction. The first tip end 351*b* extends substantially in parallel to the second side surface 34 along the first direction. The first tip end 351*b* has a plate thickness tapered as being distanced from the second side surface 34. In the present embodiment, as one example, the first tip end 351*b* has a triangular shape in a cross-section perpendicular to the first direction. The first tip end 351*b* is fragile and is thus prone to deform as compared to the remaining part of the first protrusion 35*b*. The first tip end 351*b* has a height greater than the height of the end face of the second flange 32. The first slanting portion 352*b* is an end face of the first protrusion 35*b*. The first slanting portion 352*b* extends from an end on the first side (first end) of the first tip end 351*b* toward the second side surface 34. The first slanting portion 352*b* slants with respect to the second side surface 34 such that a height of the first slanting portion 352*b* is smaller toward the first side.

The second protrusions 36*b* are plate-like portions. The second protrusions 36*b* protrude outwards of the inner case 30 in the second direction from the respective second side surfaces 34. Each second protrusion 36*b* extends along the first direction from the first slanting portion 352*b* of the first protrusion 35*b* toward the vicinity of an end on the first side (first end) of the second side surface 34. The second protrusion 36*b* has the same thickness as the first protrusion 35*b* and is formed integrally with the first protrusion 35*b*. In the present embodiment, as one example, one second protrusion 36*b* is provided to each of the two second side surfaces 34, that is, there are two second protrusions 36*b* in total. It should be noted that the second protrusions 36*b* may be separated from the first protrusion 35*b*.

The second protrusion 36*b* includes a top portion 361*b* and a second slanting portion 362*b*. The top portion 361*b* is an end face of the second protrusion 36*b* in the second direction. The top portion 361*b* extends substantially in parallel to the second side surface 34 along the first direction. The top portion 361*b* has a height smaller than the height of the end face of the second flange 32. The second slanting portion 362*b* is an end face of the second protrusion 36*b*. The second slanting portion 362*b* extends from an end on the first side (first end) of the top portion 361*b* toward the second side surface 34. The second slanting portion 362*b* slants with respect to the second side surface 34 such that a height of the second slanting portion 362*b* is smaller toward the first side.

In the present embodiment, as one example, each of the first protrusion 35*a*, the first protrusion 35*b*, the second protrusion 36*a*, and the second protrusion 36*b* has a thickness of 2 to 3 millimeters (mm).

Figure 3:
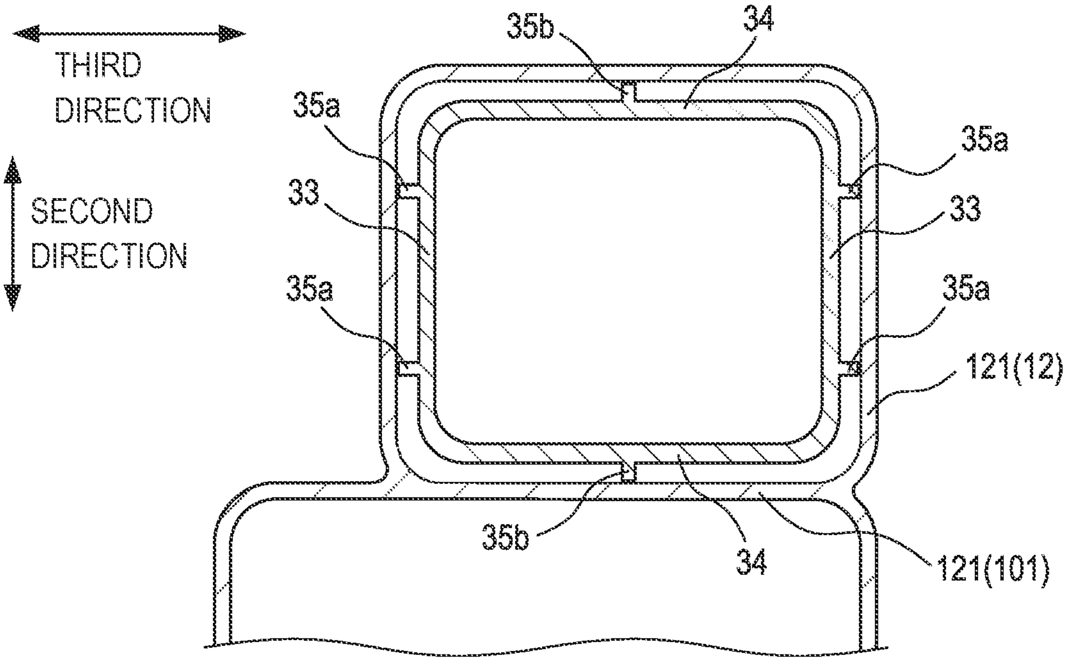
FIG. 3 is a sectional view along a line III-III in FIG. 1.
Figure 4:
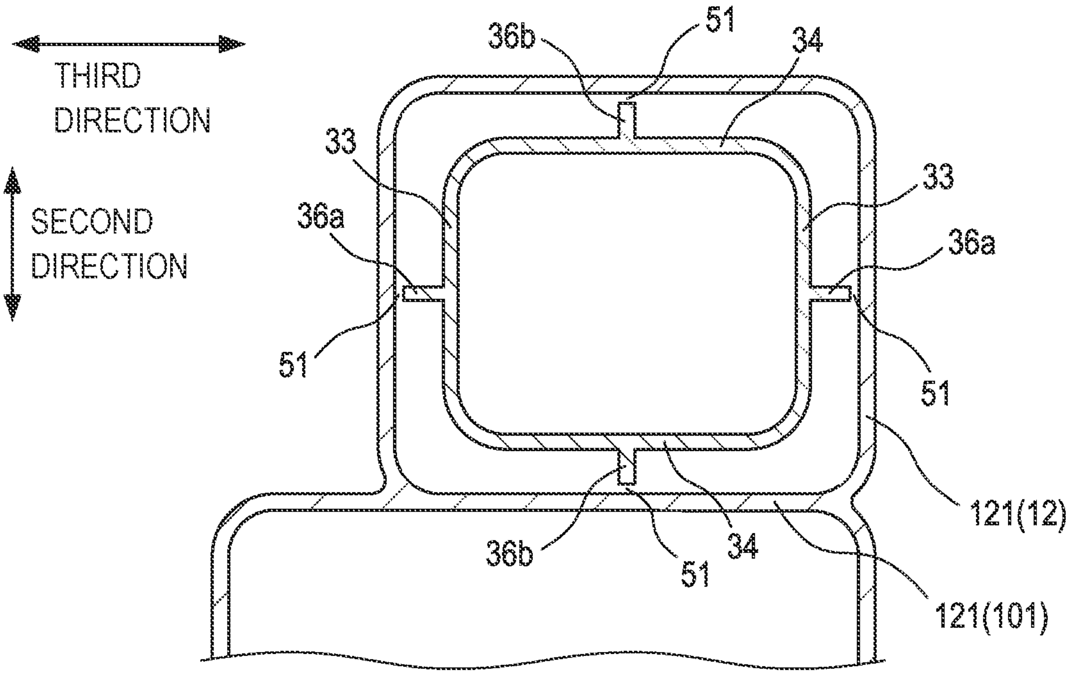
FIG. 4 is a sectional view along a line IV-IV in FIG. 1.

In the state where the inner case 30 is fitted in the second main chamber 121, the first protrusion 35*a*, the first protrusion 35*b*, and the sealing member 38 contact the inner surface of the second main chamber 121 (see, FIGS. 1 and 3). On the other hand, there is formed a gap 51 between the inner surface of the second main chamber 121 and each of the second protrusion 36*a*, the second protrusion 36*b*, and the second flange 32 (see, FIGS. 1 and 4). It should be noted that an end on the first side (first end) of the second protrusion 36*a* and an end on the first side (first end) of the second protrusion 36*b* may contact the inner surface of the second main chamber 121.

[1-1-4. Fitting Process of Inner Case]

There is provided a method of manufacturing the canister 1. The method comprises fitting the inner case 30 inside the second main chamber 121, and the fitting includes a first process without press-fit and a second process with the press-fit.

In the first process, the first flange 31 (that is, the first side) of the inner case 30 is inserted in an opening at the second end of the second main chamber 121 in the outer case 10. Subsequently, the inner case 30 is inserted into the second main chamber 121 toward the first side in the first direction (i.e., in an insertion direction) until the first protrusion 35*a* and the first protrusion 35*b* contact the second end of the second main chamber 121.

Next, in the second process followed by the first process, the inner case 30 is press-fitted inside the second main chamber 121 toward the first side in the first direction. There is no particular limitation to a method of the press-fit. In the present embodiment, as one example, the press-fit is performed with air pressure employing an ordinary press-fit machine. Hereinafter, the first tip end 351*a* of the first protrusion 35*a*, the first tip end 351*b* of the first protrusion 35*b*, and the sealing member 38 fitted in the groove 37 in an outer periphery of the first flange 31 are referred to as "press-fit portions". The press-fit portions are pressed against the inner surface of the second main chamber 121 due to the press-fit and consequently deformed. On the other hand, since the second protrusion 36*a*, the second protrusion 36*b*, and the second flange 32 are not pressed against the inner surface of the second main chamber 121, these portions are not deformed. The inner case 30 is press-fitted inside the second main chamber 121 until a surface on the first side (first surface) of the first flange 31 contacts an inner surface at the first end of the second main chamber 121.

In the first process and the second process, the inner case 30 can be inserted into the second main chamber 121 such that the second protrusion 36*a* and the second protrusion 36*b* do not contact the inner surface of the second main chamber 121. However, the second protrusion 36*a* or the second protrusion 36*b* may contact the inner surface of the second main chamber 121 due to lack of stability or the like during insertion of the inner case 30.

[1-2. Operations and Effects]

The embodiment described above can achieve operations and effects to be described below.

(1a) The process of fitting the inner case 30 inside the second main chamber 121 includes the second process of performing the press-fit. In the second process, the first tip end 351*a* of the first protrusion 35*a* and the first tip end 351*b* of the first protrusion 35*b* are pressed against the inner surface of the second main chamber 121 due to the press-fit and consequently deformed. The first protrusion 35*a* and the first protrusion 35*b* contact the inner surface of the second main chamber 121 in the state where the inner case 30 is fitted inside the second main chamber 121.

On the other hand, since the second protrusion 36*a*, the second protrusion 36*b*, and the second flange 32 are not pressed against the inner surface of the second main chamber 121, these portions are not deformed. In the state where the inner case 30 is fitted inside the second main chamber 121, the second protrusion 36*a*, the second protrusion 36*b*, and the second flange 32 do not contact the inner surface of the second main chamber 121.

When the inner case 30 is press-fitted inside the second main chamber 121, a required load (hereinafter, referred to as "press-fit load") creates a frictional force or the like of a contact portion between the inner case 30 (including the sealing member 38) and the second main chamber 121. In the above configuration, the press-fit load at the time of fitting the inner case 30 inside the second main chamber 121 creates the frictional force of the respective contact portions between the first tip end 351*a*, the first tip end 351*b*, and the sealing member 38, and the inner surface of the second main chamber 121. On the other hand, there is no or little influence of the second protrusion 36*a*, the second protrusion 36*b*, and the second flange 32 on the press-fit load. This can reduce the press-fit load at the time of press-fitting the inner case 30 inside the second main chamber 121.

In general, the press-fit load increases when there is a problem of twisting or the like of the sealing member 38 at the time of press-fitting the same, as compared to a case where the problem does not occur. Since the above-described configuration can reduce the press-fit load in the case where there is no such a problem, a difference in the press-fit load increases between cases where the problem occurs and does not occur. Therefore, the problem can be easily detected.

(1b) The first tip end 351*a* and the first tip end 351*b*, which are deformed due to the press-fit, are disposed on the second end of the inner case 30.

In such a configuration, during the process of fitting the inner case 30 inside the second main chamber 121, the inner case 30 is inserted in the second main chamber 121 from the first side thereof and remains non-press-fitted until the first protrusion 35*a* and the first protrusion 35*b* contact the second end of the second main chamber 121. Consequently, this configuration can shorten a time during which the press-fit is performed.

(1c) The inner case 30 is press-fitted inside the second main chamber 121. In the state where the inner case 30 is fitted in the second main chamber 121, the first protrusion 35*a*, the first protrusion 35*b*, and the sealing member 38 contact the inner surface of the second main chamber 121.

The above configuration inhibits loosening of the inner case 30 in the state where the inner case 30 is fitted inside the second main chamber 121. Thus, the inner case 30 can be inhibited from shaking due to a vehicle vibration and the like. Consequently, since shaking of the inner case 30 due to the vehicle vibration and the like is suppressed, a resulting pulverization of the adsorbent 41 such as activated carbon can be inhibited.

(1d) The first protrusion 35*a* and the first protrusion 35*b* are plate-like portions extending along the first direction.

Such a configuration reduces areas of respective portions of the first protrusion 35*a* and the first protrusion 35*b* contacting the inner surface of the second main chamber 121, and can therefore reduce the press-fit load at the time of the inner case 30 being press-fitted in the second main chamber 121.

(1e) The process of fitting the inner case 30 inside the second main chamber 121 includes the first process and the second process. In the first process and the second process, the inner case 30 can be inserted in the second main chamber 121 such that the second protrusion 36*a* and the second protrusion 36*b* do not contact the inner surface of the second main chamber 121. However, the second protrusion 36*a* or the second protrusion 36*b* may contact the inner surface of the second main chamber 121 due to lack of stability or the like during insertion of the inner case 30.

In the above configuration, even if the insertion direction of the inner case 30 deviates from the first direction, the second protrusion 36*a* or the second protrusion 36*b* contacts the inner surface of the second main chamber 121, to thereby restrict displacement of the inner case 30 in the second direction and the third direction. Thus, the inner case 30 can be inhibited from tilting with respect to the first direction when inserted in the second main chamber 121. Consequently, the inner case 30 can be easily inserted in the second main chamber 121.

(1f) The sealing member 38 is fitted in the groove 37 provided in the outer periphery of the first flange 31. The sealing member 38 is an elastic member. In the state where the inner case 30 is fitted inside the second main chamber 121, the sealing member 38 seals a gap between the second main chamber 121 and the first flange 31 located at the first end of the inner case 30.

The configuration above can improve sealability with respect to the gap between the first flange 31 and the second main chamber 121.

(1g) At the second end of the inner case 30, there is arranged the filter 42*e* supported by the grid 43*b*. The filter 42*e* is not joined (for example, welded) to the inner case 30, the grid 43*b*, or the like, but is supported by the hook protruding from the grid 43*b*.

Since the configuration above does not require a joint for supporting the filter 42*e*, it can reduce a production cost of the canister 1.

It should be noted that, in the first embodiment, the atmosphere port 23 corresponds to one example of the coupling port; and the second main chamber 121 corresponds to one example of the part defining the internal space in the outer case.

2. Second Embodiment

Since the canister 1 in a second embodiment has the same basic configuration as that in the first embodiment, a description is given to a difference of the second embodiment from the first embodiment. It should be noted the same reference numerals used in the first embodiment denote the same configurations and reference is made to the preceding descriptions.

Figure 5:
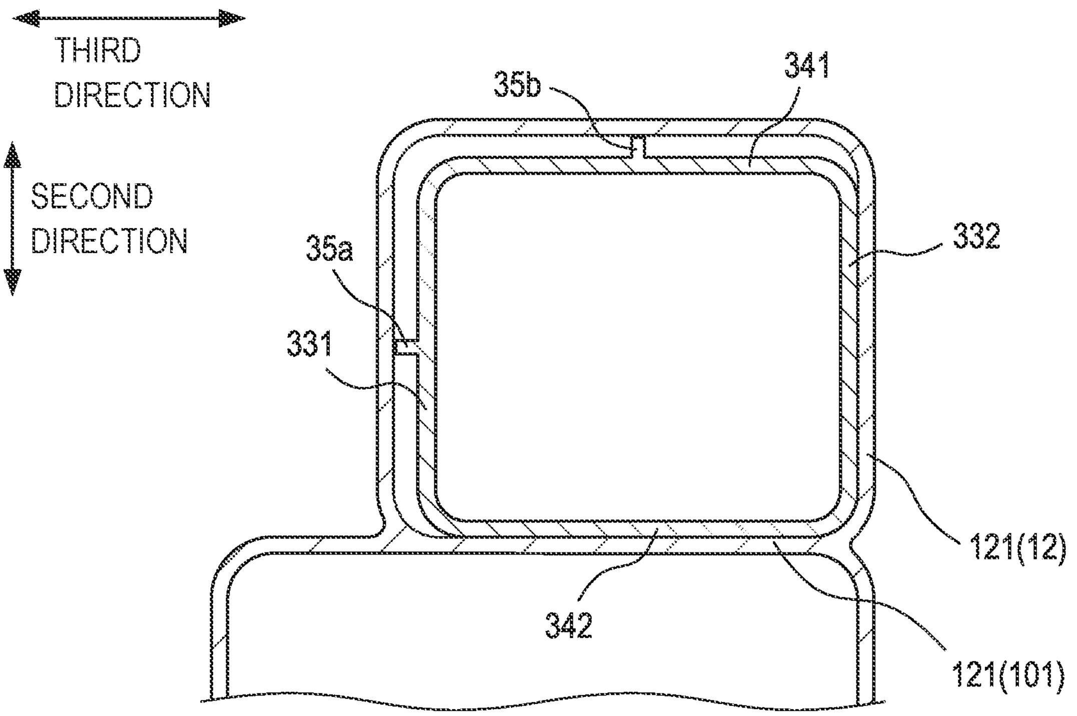
FIG. 5 is a sectional view, sliced perpendicularly to a first direction, illustrating a part of the canister according to a second embodiment provided with a first projection and a second projection.

In the first embodiment, both the first protrusion 35*a* and the second protrusion 36*a* are provided to each of the two first side surfaces 33; and the first protrusion 35*b* and the second protrusion 36*b* are provided to each of the two second side surfaces 34. In contrast, in the second embodiment, both the first protrusion 35*a* and the second protrusion 36*a* are provided to only one first side surface 33, and the first protrusion 35*b* and the second protrusion 36*b* are provided to only one second side surface 34. In this respect, the second embodiment is different from the first embodiment (see, FIG. 5).

The two first side surfaces 33 include a first non-contact surface 331 to which the first protrusion 35*a* and the second protrusion 36*a* are provided; and a first contact surface 332 without the first protrusion 35*a* and the second protrusion 36*a*. The two second side surfaces 34 include a second non-contact surface 341 to which the first protrusion 35*b* and the second protrusion 36*b* are provided; and a second contact surface 342 without the first protrusion 35*b* and the second protrusion 36*b*. There are respective gaps between the first non-contact surface 331 and the inner surface of the second main chamber 121 and between the second non-contact surface 341 and the inner surface of the second main chamber 121. The first contact surface 332 and the second contact surface 342 make surface contact with the inner surface of the second main chamber 121. In the present embodiment, as one example, one first protrusion 35*a* and one second protrusion 36*a* are provided to the first non-contact surface 331; and one first protrusion 35*b* and one second protrusion 36*b* are provided to the second non-contact contact surface 341.

In the process of fitting the inner case 30 inside the second main chamber 121, the first contact surface 332 and the second contact surface 342 slide along the inner surface of the second main chamber 121. The first contact surface 332 and the second contact surface 342 are prevented from being pressed by the inner surface of the second main chamber 121 and being deformed.

3. Other Embodiments

Although embodiments of the present disclosure have been described hereinabove, the present disclosure is not limited to the above-described embodiments and can take various forms.

(3a) In the above-described embodiments, the second main chamber 121 and the inner case 30 are formed into a substantially rectangular parallelepiped shape and have substantially rectangular shapes in the crosssections perpendicular to the first direction. However, the present disclosure is not limited hereto. For example, the second main chamber 121 and the inner case 30 may have substantially polygonal column shapes. For example, the second main chamber 121 and the inner case 30 have substantially circular cylindrical shapes. In a case where the inner case 30 is the substantially cylindrical shape member, for example, three protrusions corresponding to the first protrusion 35*a* or the first protrusion 35*b* may be provided to a side surface of the inner case 30 at equal intervals along a circumferential direction of the inner case 30.

(3b) In the above-described embodiments, the filters 42*a*, 42*b*, and 42*c* are arranged inside the first chamber 11. Between the filters 42*a* and 42*b*, and the filter 42*c* inside the first chamber 11, the adsorbent 41 is filled so as to adsorb the evaporated fuel. However, there may be the inner case 30 fitted inside the first chamber 11 in place of the filters 42*a*, 42*b*, and 42*c* and the adsorbent 41. In a case where the inner case 30 is fitted inside the first chamber 11, filters may be arranged inside the second main chamber 121 on the first side and the second side in place of fitting of the inner case 30. Between these filters, the adsorbent 41 may be filled.

(3c) The first embodiment provides four first protrusions 35*a*, two first protrusions 35*b*, two second protrusions 36*a*, and two second protrusions 36*b*; and the second embodiment provides two first protrusions 35*a*, one first protrusion 35*b*, one second protrusion 36*a*, and one second protrusion 36*b*. However, each of the first protrusion 35*a*, the first protrusion 35*b*, the second protrusion 36*a*, and the second protrusion 36*b* may be at least one in number.

In the above-described embodiments, the first protrusion 35*a* and the second protrusion 36*a* are provided to the first side surface 33. However, the first protrusion 35*a* and the second protrusion 36*a* may be provided to the second side surface 34. Although the first protrusion 35*b* and the second protrusion 36*b* are provided to the second side surface 34, they may be provided to the first side surface 33.

(3d) In the above-described embodiments, both the first protrusion 35*a* and the first protrusion 35*b* are disposed at the second end of the inner case 30. However, the first protrusion 35*a* and the first protrusion 35*b* may be disposed on the outer peripheral surface of the inner case 30 excluding the second end.

(3e) In the above-described embodiments, each of the second protrusion 36*a* and the second protrusion 36*b* is a plate-like portion extending on the outer peripheral surface of the inner case 30 along the first direction from the second end to the vicinity of the first end of the inner case 30. However, these protrusions are not limited hereto. For example, there may be two or more second protrusions 36*a* and two or more second protrusions 36*b*. The two or more second protrusions 36*a* and the two or more second protrusions 36*b* may be aligned at intervals on the outer peripheral surface of the inner case 30 along the first direction from the second end to the vicinity of the first end of the inner case 30.

(3f) In the above-described embodiments, the fluid flows along the first direction inside the first chamber 11 and the second chamber 12 in the outer case 10 and inside the inner case 30. However, a flow direction of the fluid inside the inner case 30 may be a direction different from the first direction. For example, the fluid may flow inside the inner case 30 along the second direction or the third direction.

(3g) Two or more functions performed by one element in the aforementioned embodiments may be achieved by two or more elements. One function performed by one element may be achieved by two or more elements. Two or more functions performed by two or more elements may be achieved by one element. One function performed by two or more elements may be achieved by one element. Furthermore, a part of a configuration in the aforementioned embodiments may be omitted. Still further, at least a part of the configuration in the aforementioned embodiments may be added to or replaced with another configuration of the aforementioned embodiments.

Technical Ideas Disclosed in Present Disclosure

[Item 1]

A canister configured to adsorb and desorb an evaporated fuel originating in a fuel tank of a vehicle, the canister comprising: an outer case including an inner surface that defines an internal space extending in a first direction;

a coupling port coupling an inside and an outside of the outer case;

an inner case being a cylindrical member, the inner case accommodating therein an adsorbent for adsorbing the evaporated fuel; and at least one first protrusion protruding outwards from an outer surface of the inner case, the outer case being configured to carry a fluid through the internal space in the first direction, the inner case being press-fitted inside the outer case so as to be accommodated in the internal space, and the at least one first protrusion contacting a part of the inner surface of the outer case extending in the first direction.

[Item 2]

The canister according to Item 1, wherein the inner case comprises a first end, and a second end located opposite to the first end, wherein the first end is located closer to the coupling port with respect to the second end, and wherein the at least one first protrusion is formed in a vicinity of the second end.

[Item 3]

The canister according to Item 1 or 2, wherein the at least one first protrusion has a plate-like shape and extends along the first direction.

[Item 4]

The canister according to any one of Items 1 to 3, further comprising a sealing member, wherein the inner case comprises a first end, and a second end located opposite to the first end, wherein the first end is located closer to the coupling port with respect to the second end, and wherein the sealing member seals a gap between a periphery of the first end and the inner surface of the outer case.

[Item 5]

The canister according to any one of Items 1 to 4, further comprising at least one second protrusion, wherein the at least one second protrusion protrudes outwards from an outer peripheral surface of the inner case, and wherein a gap is provided between the at least one second protrusion and the outer case, and wherein the at least one second protrusion is formed along the first direction.

What is claimed is:

1. A canister configured to adsorb and desorb an evaporated fuel originating in a fuel tank of a vehicle by an adsorbent, the canister comprising:

an outer case including an inner surface that defines an internal space extending in a first direction;

a coupling port coupling an inside and an outside of the outer case;

an inner case being a rounded rectangular tubular member, the inner case holding therein the adsorbent;

at least one first protrusion protruding outwards from an outer surface of the inner case so as to be substantially perpendicular to the outer surface of the inner case, and at least one second protrusion having a gap being provided between the at least one second protrusion and the outer case, the outer case being configured to carry a fluid through the internal space in the first direction, the inner case being press-fitted inside the outer case so as to be held in the internal space, the inner case comprising a first end in the first direction and a second end located opposite to the first end in the first direction, the first end being located closer to the coupling port with respect to the second end, the at least one first protrusion contacting a part of the inner surface of the outer case extending in the first direction, having a plate-like shape, and extending along the first direction, the at least one first protrusion having a plate thickness direction running along a circumferential direction of the inner case, and the at least one second protrusion protruding outwards from the outer surface of the inner case so as to be substantially perpendicular to the outer surface of the inner case and extending from a vicinity of the second end to a vicinity of the first end along the first direction.

2. The canister according to claim 1, wherein the at least one first protrusion is formed in the vicinity of the second end.

3. The canister according to claim 1, further comprising a sealing member, wherein the sealing member seals a gap between a periphery of the first end and the inner surface of the outer case.

* * * * *